(12) United States Patent
Brindle et al.

(10) Patent No.: US 11,806,789 B2
(45) Date of Patent: Nov. 7, 2023

(54) PROCESSES FOR PRODUCING GRANULAR COPPER

(71) Applicant: Destiny Copper Inc., St. Catharines (CA)

(72) Inventors: Ian David Brindle, St. Catharines (CA); Molina Audrey Lorraine Sheepwash, Welland (CA)

(73) Assignee: Destiny Copper Inc., St. Catharines (CA)

( * ) Notice: Subject to any disclaimer, the term of this patent is extended or adjusted under 35 U.S.C. 154(b) by 0 days.

(21) Appl. No.: 17/811,673

(22) Filed: Jul. 11, 2022

(65) Prior Publication Data

US 2022/0402030 A1 Dec. 22, 2022

Related U.S. Application Data

(63) Continuation of application No. PCT/CA2022/050668, filed on May 2, 2022.

(60) Provisional application No. 63/202,486, filed on Jun. 14, 2021.

(51) Int. Cl.
| | |
|---|---|
| *B22F 9/20* | (2006.01) |
| *C22B 3/08* | (2006.01) |
| *C22B 5/00* | (2006.01) |
| *C22B 15/00* | (2006.01) |

(52) U.S. Cl.
CPC ............ *B22F 9/20* (2013.01); *C22B 3/08* (2013.01); *C22B 5/00* (2013.01); *C22B 15/0071* (2013.01); *C22B 15/0089* (2013.01); *B22F 2301/10* (2013.01)

(58) Field of Classification Search
CPC ........................................................ B22F 9/20
See application file for complete search history.

(56) References Cited

U.S. PATENT DOCUMENTS

| | | |
|---|---|---|
| 86,754 A | 2/1869 | Hunt et al. |
| 227,902 A | 5/1880 | Hunt et al. |
| 364,174 A | 5/1887 | Hunt et al. |
| 3,630,722 A | 12/1971 | Chew |

(Continued)

FOREIGN PATENT DOCUMENTS

| | | |
|---|---|---|
| RU | 2052324 C1 | 1/1996 |
| WO | 2009/007792 A1 | 1/2009 |

OTHER PUBLICATIONS

Costa et al., Copper recovery by cementing from waste solutions derived from the manufacturing/printing industry, Journal of Environmental Chemical Engineering, vol. 8, Issue 4, Aug. 2020, 103989.*

(Continued)

*Primary Examiner* — Christopher S Kessler
(74) *Attorney, Agent, or Firm* — Bereskin & Parr LLP/S.E.N.C.R.L., s.r.l.

(57) ABSTRACT

Processes for producing copper granules on a surface of a reducing metal. The process can include contacting the reducing metal with an aqueous solution comprising a copper(II) salt and a halide. The molar ratio of the halide to the copper(II) in the copper (II) salt can be at least about 3:1. The granular copper can be produced on a surface of the reducing metal, and is optionally removed from the surface of the reducing metal by shaking, washing, and/or brushing, and/or optionally with stirring and/or circulating of the aqueous solution.

18 Claims, 6 Drawing Sheets

(56) References Cited

U.S. PATENT DOCUMENTS

| | | | |
|---|---|---|---|
| 3,679,399 A | | 7/1972 | Inton et al. |
| 3,840,365 A | * | 10/1974 | Hammes, Sr. ...... C22B 15/0071 |
| | | | 75/731 |
| 3,902,896 A | | 9/1975 | Borbely et al. |
| 4,384,890 A | | 5/1983 | Clevenger et al. |
| 4,594,132 A | | 6/1986 | Satchell, Jr. et al. |

OTHER PUBLICATIONS

Bonan et al., "Chalcopyrite Leaching by CuCI2 in Srong NACI Solutions", Metallurgical Transactions B, vol. 12B, 269-274, Jun. 1981.

Sully Science, "Activity Series of Metals with Copper (II) Sulfate Solution", Jun. 1, 2012, https://www.youtube.com/watch?v=c26Eg84hLak.

Rychkov et al., "The Experience of Teaching Solid State Chemistry in a Secondary School", 28th European Crystallographic Meeting, ECM 28, UK, 2013 Acta Cryst. 2013, A69, s664.

Mathur, "Solid phase reduction of salt crystals", Journal of Chemical Education, 1962, 39, 11, A897, Nov. 1968.

Kao et al., "Microstructura study of the effects of chloride ion on electroplating of copper in copper sulfate-sulfuric acid path", J. Electrochem. Soc., 2005, 152, C605-C611.

Hardesty, "Anion effects in copper deposition", J. Electrochem. Soc., 1970, 117, 168-172.

Carneval et al., "The influence of the anion on copper electrocrystallization", J. Electrochem Soc., 1981, 128, 1215-1221.

Dini et al., "Electrodeposition" (Chapter 2) in Modern Electroplating. Mordechay Schlesinger, Milan Paunavic, Section 2.4.2, 36.

International Search Report and Written Opinion dated Aug. 1, 2022 in respect of PCT/CA2022/050668.

Pradhan et al., "Influence of Chloride Ion On Electrocrystallization of Copper", Plating & Surface Finishing, March 1996, 56-63.

Martino et al., "The effect of anions on the anodic formation of copper sulphide films on copper", Electrochimica Acta, 331 (2020) 135319.

Zhao et al., "Electrochemistry of High Concentration Copper Chloride Complexes", Analytical Chemistry, 2013, 85, 7696-7703.

Toro et al., "Leaching of Pure Chalcocite in a Chloride Media Using Sea Water and Waste Water", Metals 2019, 9, 780.

Natishan et al., "Chloride Ion Interactions with Oxide-Covered Aluminum Leading to Pitting Corrosion: A Review", Journal of The Electrochemical Society, 161 (9) C421-C432 (2014).

Petrovic et al., "Reaction of Aluminum with Water to Produce Hydrogen", U.S. Department of Energy, Version 1.0, 2008.

The reaction of aluminium and copper (II) sulfate, Royal Society of Chemistry, https://edu.rsc.org/experiments/the-reaction-of-aluminium-and-copperii-sulfate/439.article.

* cited by examiner 0 equiv. NaCl        3 equiv. NaCl        5 equiv. NaCl

PROCESSES FOR PRODUCING GRANULAR COPPER

CROSS-REFERENCE TO RELATED APPLICATIONS

This is a continuation application of International Application No. PCT/CA2022/050668 filed on May 2, 2022, which claims priority to U.S. Provisional Application No. 63/202,486 filed on Jun. 14, 2021, and the entire contents of each are hereby incorporated herein by reference.

FIELD

The present disclosure relates to processes for producing granular copper metal comprising reducing a copper(II) salt in the presence of a halide.

BACKGROUND

The following paragraphs are not an admission that anything discussed in them is prior art or part of the knowledge of persons skilled in the art.

The first recorded displacement of copper from solution of copper sulfate by elemental iron appears to have been published around 1775 by Torburn Olof Bergman, who observed: " . . . iron added to the solution [of vitriol of copper] is soon observed to be covered with a cupreous pellicle; for it yields part of its phlogiston, which is necessary to the reduction of the copper, and by this means becomes itself soluble without the emission of any inflammable air." (Quoted by Jack T. Gentry Bachelor of Science in Metallurgical engineering thesis, Montana School of Mines 1950.) In this record, the appearance of copper is as a skin (pellicle) on the surface of the iron immersed in the copper sulfate solution. This appearance in more recent literature is described as copper being deposited as a "cement" and the process, as "cementation".

An early patent to describe the production of copper from a chloride-rich copper solution is U.S. Pat. No. 86,754. The use of chloride in the production of copper from its ores is based upon two distinctly separate processes. The first process, which has been widely used, is in the generation of suitable lixiviants, such as $FeCl_2$, $FeCl_3$, $CuCl_2$, and CuCl, which act upon sulfidic ores to solubilize the copper. The second process was first described by Hunt and Douglas in the patent mentioned above and in subsequent updates by the same authors (U.S. Pat. Nos. 227,902 and 364,174). U.S. Pat. No. 227,902 directs the addition of " . . . some soluble chloride, such as common salt, at the rate of 2 lb of salt to each pound of copper dissolved" i.e. at a molar ratio of chloride to copper of slightly more than 2:1. No explanation or justification for this amount of NaCl is provided in the patent.

In U.S. Pat. No. 3,902,896, the use of an additive to produce a deposit of copper that flakes off the surface is disclosed. This process identifies the additive as thiosulfate that is used in mildly acidic solution.

International Publication No. WO 2009/007792 A1 discloses a method of producing copper from a solution containing a copper(II) salt. The method includes a first step of reducing at least some of the copper(II) salt to a copper(I) salt, solubilizing the copper (I) salt to produce a soluble copper(I) complex (optionally in the presence of a soluble halide) and reducing the soluble copper(I) complex to copper in a second reduction step. The use of sulfite is proposed for the initial partial reduction reaction to generate Cu(I). This initial partial reduction generates only a catalytic amount of Cu(I) as the subsequent reduction to generate Cu(0) will generate further Cu(I) to be reduced until the entire copper in solution is reduced to the metal. The solubilization step can take place simultaneously with the complexation with chloride. The complexation reaction is proposed to involve the addition of "excess" chloride, suggesting that the excess chloride is necessary to generate $CuCl_4^{3-}$.

The effect of chloride on the character of the copper that is produced by a reduction reaction has been reported to be dependent upon chloride concentration and, although at low concentrations it has been reported that the presence of chloride enhances the brightness of the copper that can be plated, high chloride concentrations lead to general surface roughening. In the trade, surface roughening is deemed undesirable and publications that report on this matter usually describe the appearance of this roughening effect at chloride concentrations up to 2.5 M. For example, Kao et al. report that the presence of chloride gives rise to precipitation of CuCl on the surface of copper during reduction. (See Y. L. Kao, K. C. Li, G. C. Tu, C. A. Huang. Microstructura study of the effects of chloride ion on electroplating of copper in copper sulfate-sulfuric acid bath. J. Electrochem. Soc., 2005, 152, C605-C611.) This phenomenon was observed at concentrations of chloride up to 2.5 M although, at this concentration, this effect was small. At high levels of chloride (9 M LiCl), formation of soluble higher complexes of copper (for example, $CuCl_2$ or $CuCl_2^-$) prevent any accumulation of CuCl and permit the total reduction of copper.

Several authors have commented on the significance of anion concentrations on the surface morphology of deposited copper. (See David W. Hardesty, Anion effects in copper deposition. J. Electrochem. Soc., 1970, 117, 168-172; G. Carneval, J. Babczuk de Cusminsky. The influence of the anion on copper electrocrystallization. J. Electrochem Soc., 1981, 128, 1215-1221; and Jack W. Dini, Dexter D. Snyder. Electrodeposition (Chapter 2) in Modern Electroplating. Mordechay Schlesinger, Milan Paunavic, Section 2.4.2, p 36.) For example, Carneval et al. teach that it is important to control the chloride ion concentration at 60-80 ppm and that, below 30 ppm, deposits will be dull, striated, coarse, and step plated and above 120 ppm, deposits will be coarse grained and dull, and the anodes will polarize, causing plating to stop. Carneval et al. also noted that the elongation of copper deposits in each case was found to rise dramatically for chloride additions in the 10 $mgL^{-1}$ range. Carneval et al. further teach that, among the halides, Cl is the most effective over a wide range of concentrations (40-150 $mgL^{-1}$) in keeping stress to a null value, that the presence of about 50 $mgL^{-1}$ chloride is optimum for permitting an increase in microhardness without raising internal stress and that the chloride ion exerts no influence on throwing power.

Copper crystals have been deposited using iron as a reducing metal from an aqueous copper(II) sulfate solution in the presence of sodium chloride. For example, Rychkov et al. report the formation of copper crystals using a system involving successive layers of copper sulfate, sodium chloride, filter paper and a source of iron which were submerged in a saturated solution of sodium chloride. (See D. A. Rychkov et al., 28th European Crystallographic Meeting, ECM 28, UK, 2013 Acta Cryst. 2013, A69, s664.) Similarly, Mathur et al. disclose an experiment in which crystals of copper metal are formed using a system in which copper(II) sulfate crystals are placed at the bottom of a jar, this layer is covered with sodium chloride powder, filter paper is placed over the salt, an iron plate is placed on top of the paper then the jar is then filled with a saturated solution of sodium chloride up to about 1.5 inches above the iron plate. (See Mathur et al., J. Chem. Educ. 1962, 39:11, A897.) In both these examples, the objective was to illustrate the formation of copper crystals. In neither case did the authors investigate the reaction for any purpose other than the generation of macroscopic, crystalline copper. The paper by Rychov et al. describes an exercise for highschool students, where the students were asked to change parameters of the reaction and then carry out crystallographic measurements on the copper crystals. In the second case, the objective appears to be aesthetic. The description of the process in the paper does not describe any optimization of either crystal size or yield nor is there any information reported about the amount of reagents that were used.

INTRODUCTION

The following is intended to introduce the reader to the detailed description that follows and not to define or limit the claimed subject matter.

There is a continuing need for processes for the deposition of granular copper metal on reducing metal surfaces, for example, copper leaching processes, that allows for ease of removal and collection of the copper metal from the reducing metal surface. Such hydrometallurgical processes can unlock smaller, stranded deposits for copper extraction that were previously deemed uneconomically viable to develop utilizing traditional, larger pyrometallurgical processes with significant greenhouse gas emissions. There is a significant reduction in energy usage as the energy stored in the recycled iron is effectively reused in the chemical extraction process.

Copper was advantageously reduced to granular metallic copper from a solution containing copper, sulfuric acid and halide (NaCl) in a single step. An advantage of the process herein described is that the granular copper, generated at the surface of the reducing metal, can be weakly adhered to the surface and therefore can be removed by methods such as shaking, washing, and/or brushing the metal from the surface, and/or can be assisted with stirring and/or circulating of the aqueous solution. Therefore the weakly bound copper at the iron surface can readily be collected and washed clean of supernatant solution for subsequent melting into suitable forms, for example, as copper anodes which can be placed in an electrolytic cell to generate cathode copper in a form that is acceptable for trade on the London Metal Exchange. This process differs from the cementation processes that occurs where copper in solution is predominantly present as the hydrated cation. In this case, copper tends to be held at the surface more strongly and has been described as a "skin" or a cement, and must be removed by more aggressive scraping.

Accordingly, the present disclosure includes a process for producing granular copper metal, the process comprising:
  contacting a reducing metal with an aqueous solution comprising:
  (i) a copper(II) salt; and
  (ii) a halide,
wherein the molar ratio of the halide to the copper(II) in the aqueous solution is at least about 3:1 and the granular copper is produced on a surface of the reducing metal, and is optionally removed from the surface of the reducing metal by shaking, washing, and/or brushing, and/or optionally with stirring and/or circulating of the aqueous solution.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way.

DETAILED DESCRIPTION

Figure 1:
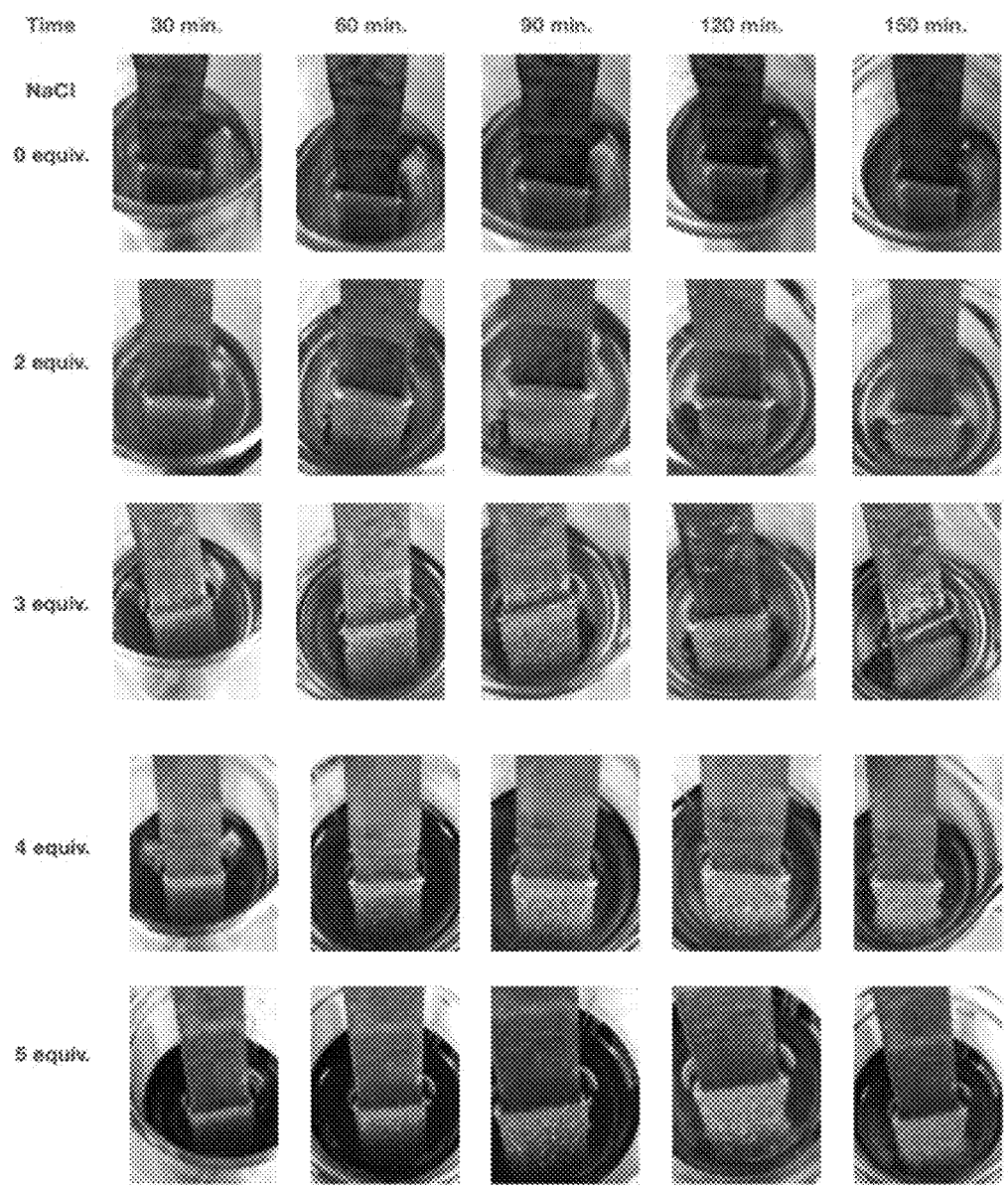
FIG. 1 shows exemplary photographs of copper deposits on an iron bar from mildly acidic (pH 2) solutions comprising 0.8371 M $CuSO_4$ and various amounts of NaCl (from second from top to bottom rows: 2, 3, 4, and 5 equivalents) according to examples of the present disclosure in comparison to copper deposits on an iron bar from an acidic (pH 2) solution comprising 0.8371 M $CuSO_4$ and no NaCl (top row) at times of, from left to right columns: 30, 60, 90, 120, and 150 minutes.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

I. Definitions

Unless otherwise indicated, the definitions and examples described in this and other sections are intended to be applicable to all examples and aspects of the present disclosure herein described for which they are suitable as would be understood by a person skilled in the art.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

As used in this disclosure, the singular forms "a", "an" and "the" include plural references unless the content clearly dictates otherwise.

The term "suitable" as used herein means that the selection of specific reagents or conditions will depend on the reaction being performed and the desired results, but nonetheless, can generally be made by a person skilled in the art once all relevant information is known.

The term "reducing metal" as used herein refers to a metal that reduces copper(II) to copper(0) in the processes of the present disclosure.

The term "halide" as used herein refers to a halogen anion and includes chloro and bromo.

The term "granule" as used herein refers to particle of any size generally having an irregular shape.

The term "crystal" as used herein refers to a solid material whose constituents (such as atoms, molecules, or ions) are arranged in a highly ordered microscopic structure, forming a crystal lattice that extends in all directions.

II. Processes

Copper was advantageously reduced to granular metallic copper from a solution containing copper, sulfuric acid and halide (NaCl) in a single step. This one-step reduction has advantages over other processes, for example, as it does not rely on any intermediate steps in which copper is reduced from the +2 to the +1 oxidation state prior to reduction of the Cu(I) to Cu(0). In processes of the present disclosure, copper ore can, in some examples, be leached by sulfuric acid to obtain a solution comprising a copper(II) salt, followed by addition of sodium chloride or sulfuric acid containing sodium chloride. In both cases, the chloride concentration is present at a concentration sufficiently high so as to ensure that essentially all the copper in the pregnant liquor is in the form of $CuCl_4^{2-}$; e.g. a molar concentration of about 3-5 times the molar concentration of copper(II) in the solution comprising the copper(II) salt. It will be appreciated that, with a molar concentration of about 3:1, for example, it is likely that a substantial portion would be $CuCl_3^-$ at the beginning of the reaction. As copper is precipitated out, the predominant species would be $CuCl_4^{2-}$. The solution comprising the copper(II) salt was exposed to a reducing metal which, in these examples, was an iron bar. The temperature was ambient. Under these conditions, copper was produced at the surface of the iron in the form of visible granules which, in some examples, grew to a size greater than 1 mm. Copper granules, with a particle size greater than 88 μm accounted for 99% of the copper; 79% had a particle size greater than 250 μm. An advantage of the process herein described is that the granular copper, generated at the surface of the reducing metal surface, weakly adhered to the surface and therefore can be removed by methods such as shaking, washing, and/or brushing the metal from the surface, and/or optionally with stirring and/or circulating of the aqueous solution.

Accordingly, the present disclosure includes a process for producing granular copper metal, the process comprising:

contacting a reducing metal with an aqueous solution comprising:
(i) a copper(II) salt; and
(ii) a halide, wherein the molar ratio of the halide to the copper(II) in the aqueous solution is at least about 3:1 and the granular copper is produced on a surface of the reducing metal, and is optionally removed from the surface of the reducing metal by shaking, washing, and/or brushing, and/or optionally with stirring and/or circulating of the aqueous solution.

In some examples, the molar ratio of the halide to the copper(II) in the aqueous solution is about 3:1. In some examples, the molar ratio of the halide to the copper(II) in the aqueous solution is at least 3:1. In some examples, the molar ratio of the halide to the copper(II) in the aqueous solution is from about 3:1 to about 5:1.

The reducing metal can be any suitable reducing metal. For example, a person skilled in the art would readily understand, that sodium (Na) and potassium (K) metal would be too reactive for the present process and would, for example, react with the water in the aqueous solution. Accordingly, sodium, potassium and similar metals would not be understood to be suitable reducing metals for the processes of the present disclosure. In contrast, iron (Fe) has advantages of being low in cost, and in the examples of the present disclosure was observed to have weak adhesion of the granular copper to the surface of the metal, as well as forming suitable macroscopic granular copper. Accordingly, iron is desirably reactive, for example, to deliver the copper as manageable particles for subsequent work-up. Accordingly, in some examples, the reducing metal is iron. Other reducing metals that may be useful in the processes of the present application are zinc (Zn), aluminum (Al), calcium (Ca) and/or magnesium (Mg). Accordingly, in some examples, the reducing metal is selected from iron, zinc, aluminum, calcium, magnesium and combinations thereof. In some examples, the reducing metal is comprised in a suitable alloy. For example, suitable alloys of iron include steel (an alloy comprising iron, carbon and optionally other elements wherein the carbon is present in an amount of equal to or less than about 2 wt %, based on the total weight of the alloy) and cast iron (an alloy comprising iron, carbon, silicon and optionally other elements, wherein the carbon is present in an amount of greater than 2 wt %, based on the total weight of the alloy).

The reducing metal can be in any suitable form. For example, a form having a high surface area may be advantageous. Suitable forms include a plate, a rod, a bar, a beam, a scrap or combinations thereof. Accordingly, in some examples, the reducing metal is in the form of a plate, a rod, a bar, a beam, a scrap or combinations thereof. In some examples, the reducing metal is in the form of a plate that has a substantially flat surface.

The halide is any suitable halide. For example, copper bromide would be expected by the person skilled in the art to react similarly to copper chloride. In some examples, the halide is a chloride, a bromide or combinations thereof. In some examples, the halide is a chloride.

In some examples, the halide is present in a granulization enhancing amount. In some examples, the granulization enhancing amount is an amount that leads to the production of copper granules on the surface of the reducing metal that desirably weakly adhere to the surface. In contrast, amounts lower than the granulization enhancing amount lead, for example, to "cementing" of copper on the surface of the reducing metal. In some examples, the granulization enhancing amount of the halide when the halide is chloride, is an amount that is sufficiently high such that at least substantially all of the copper in the aqueous solution comprising the copper(II) salt and the chloride is in the form of $CuCl_4^{2-}$, for example, a concentration of the chloride that is at least about 3 times the molar concentration of copper(II) in the aqueous solution. Again, at the beginning of the reaction, a substantial portion may be $CuCl_3^-$, and the predominant species would be $CuCl_4^{2-}$ as the reaction progresses.

The halide is introduced into the aqueous solution by any suitable means, the selection of which can be made by a person skilled in the art. In some examples, the halide is introduced into the aqueous solution in the form of a suitable alkali or alkaline earth metal salt. In some examples, the alkali or alkaline earth metal salt is a sodium or calcium salt; i.e. the halide is introduced into the aqueous solution in the form of a sodium or calcium salt. In some examples, when calcium chloride, for example, or another source of chloride, is the source of chloride in the processes of the disclosure, the presence of the calcium and other such "spectator ions" may cause side reactions, for example precipitation of the sulfate as gypsum ($CaSO_4$). In such examples, a person skilled in the art would understand that other agents may be added to deal with such side reactions. For example, a precipitating agent can be added to specifically remove calcium.

The concentration of the copper(II) salt in the aqueous solution is any suitable concentration. For example, a suitable concentration is lower than the solubility limit of the copper(II) salt. A person skilled in the art would readily be able to determine the solubility limit of a particular copper (II) salt under particular conditions. In some examples, the concentration of the copper(II) salt in the aqueous solution is at least about 0.5 M. In some examples, the concentration of the copper(II) salt in the aqueous solution is from about 0.5 M to about 0.9 M.

The copper(II) salt used to prepare the aqueous solution is any suitable copper(II) salt. In some examples, the aqueous solution is prepared by combining $CuSO_4$ (copper(II) sulfate) or $CuCl_2$ (copper(II) chloride) with the halide. In some examples, the copper(II) salt used to prepared the aqueous solution is $CuSO_4$ (copper(II) sulfate).

The aqueous solution is prepared by any suitable means, the selection of which can be made by a person skilled in the art. In some examples, the aqueous solution is prepared by a process comprising adding a salt of the halide to an aqueous solution comprising the copper(II) salt.

In some examples, the aqueous solution comprising the copper(II) salt is obtained from a process comprising leaching a copper ore. Such processes are well known in the art and the selection of a suitable process can be made by a person skilled in the art. The selection of a suitable process may depend, for example, on whether the copper ore comprises a copper oxide ore or a copper sulfide ore. For example, copper oxide ores are readily acid leachable, for example, with dilute solutions of acids such as sulfuric acid. Accordingly, in some examples, the copper ore is a copper oxide ore and is leached with sulfuric acid. In some examples, the copper ore comprises malachite, azurite, cuprite, chrysocolla, or combinations thereof. In contrast, sulfidic copper ores such as chalcocite, covellite, bornite, chalcopyrite or combinations thereof may also be useful to produce the aqueous solution comprising the copper(II) salt but are not readily acid leachable without process conditions such as but not limited to preliminary roasting (i.e. to generate copper oxides which are readily leachable with acids such as sulfuric acid), pressure leaching, grinding and/or bioleaching. Accordingly, an advantage of using a copper oxide ore to produce the aqueous solution comprising the copper(II) salt in the processes of the present disclosure is that it may avoid the use of expensive process steps such as preliminary roasting which would be energy intensive and would generate potentially polluting compounds, such as sulfur dioxide.

In some examples, the aqueous solution further comprises an acid. In some examples, the acid is selected from sulfuric acid, hydrochloric acid and nitric acid, or a mixture thereof. In some examples, the acid is sulfuric acid. In some examples, the process can include adding an acid to the aqueous solution comprising the copper(II) salt. In some examples, for example, wherein the copper(II) salt is obtained from a process comprising leaching a copper ore, the sulfuric acid is already present in the aqueous solution comprising the copper(II) salt as a result of the leaching conditions.

In some examples, the aqueous solution has a pH, of from about 1 to about 4, about 2 to about 3, about 2 or about 3. At a low pH (i.e. less than 2), the aqueous solution can attack the iron and produce hydrogen gas. This may generate trace amounts of arsine, and elemental arsenic can be formed in the granular copper at the surface of the reducing metal. This contamination of copper by arsenic can have a deleterious effect upon conductivity. However, at a high pH (i.e. greater than 3), solid Fe(III) can precipitate out of the aqueous solution. The inventors believe that a pH of between 2 and 3 can be optimal.

Reagents can be adjusted to establish a desired initial pH for the process. In some examples, the process can include adding an acid to the aqueous solution comprising the copper(II) salt to obtain a desired pH. As noted above, the acid can be sulfuric acid.

In some examples, the process can include adding a base to the aqueous solution comprising the copper(II) salt to obtain a desired pH. In some examples, the aqueous solution further comprises an inorganic base. In some examples, the base is sodium hydroxide.

In some examples, when the halide is chloride and the chloride combined with sulfuric acid, the chloride and subsequently Cu(I)Cl and/or $CuCl_2$ may act as ancillary lixiviants and result in extraction of copper and precipitation of sulfur, as outlined in Norman Toro et al. (See Norman Toro et al., Metals 2019, 9, 780.)

In some examples, the contacting the reducing metal with the aqueous solution is for a time of at least about 1 hour. In some examples, the time is from about 1 hour to about 3 hours or about 2 hours.

In some examples, the granular copper is removed from the surface of the reducing metal by shaking, washing, and/or brushing. In some examples, the granular copper does not require scraping or other such means to be removed from the surface of the reducing metal.

In some examples, greater than about 90% of the granular copper produced has a particle size greater than about 88 µm. In some examples, greater than about 95% of the granular copper produced has a particle size greater than about 88 µm. In some examples, about 99% of the granular copper produced has a particle size greater than about 88 µm.

In some examples, greater than about 70% of the granular copper produced has a particle size greater than about 250 µm. In some examples, greater than about 75% of the granular copper produced has a particle size greater than about 250 µm. In some examples, about 79% of the granular copper produced has a particle size greater than about 250 µm.

In some examples, the granular copper produced is copper crystals.

In some examples, removal of the granular copper from the surface of the reducing metal can be assisted by stirring and/or circulating the aqueous solution. In such examples, the granular copper also may not require scraping or other such means to be physically removed. Instead, the copper granules can be permitted to grow on the surface of the reducing metal until they reach a sufficient size such that they are removed from the surface of the reducing metal by the force of gravity, and assisted by the flow of solution in the vicinity of the reducing metal. Stirring and/or circulation of the aqueous solution, without creating turbulence, will also increase the reaction rate at the reducing metal.

In some examples, the temperature during the contacting is from about 4° C. to about 40° C. In some examples, the temperature during the contacting is ambient, for example, a temperature of about 15° C. to about 25° C.

The teachings of the present disclosure can yield several environmental benefits. The processes herein rely primarily on chemical potential, and its energy requirements can be quite low as compared to other methods of copper production, including smelting or other hydrometallurgical processes, such solvent extraction and electrowinning, which may also generate significant pollution. As noted above, process steps such as preliminary roasting can be avoided, which can be energy intensive and/or generate compounds such as sulfur dioxide. The processes herein can also be implemented on site at a mine or other locations with a source of copper, including recovery from tailing ponds and waste heaps. Production of the granular copper on site can reduce the shipping and storage requirements for the resulting product, and thereby further reduce greenhouse gas emissions resulting from long distance transportation of low value copper concentrate as opposed to high value, high purity copper.

The following examples of the present disclosure are intended to be illustrative but non-limiting:

EXAMPLES

Example 1: Effect of NaCl Concentration on Copper Deposition (a) A 0.8371 M solution of $CuSO_4$ was added to each of five 100 mL beakers (50 mL each). To each beaker NaCl was dissolved as follows: solution #1—0 g (0 equiv.); solution #2—4.627 g (1.9 equiv.); solution #3—7.266 g (3.0 equiv.); solution #4—9.755 g (4.0 equiv.); solution #5—12.146 g (5.0 equiv.). The pH of the solutions was adjusted to 2 with $H_2SO_4$. Iron bars were placed in the beakers at an angle. The reaction was checked at 30 minute intervals to determine the relative quality and quantity of granules deposited (FIG. 1). Overall, copper granule size appeared to increase with increasing NaCl concentration over 120 minutes. After that point, the granules either became too heavy and fell off the iron into the solution or they began to grow fuzzy on the surface (concentration dependent). The solution with no NaCl added had copper plated on the iron and was very difficult to remove. All other solutions, the copper was easily removed by simply shaking the iron bar in the solution or lightly tapping on the side of the beaker. The yields for all solutions were similar (#1: 81%; #2: 88%; #3: 76%; #4: 89%; #5: 91%) after leaving for 24 hours.

(b) The reaction described in (a) was repeated with a 0.8331 M $CuSO_4$ solution (50 mL in each of three beakers) with 3.0 (7.216 g), 4.0 (9.693 g) and 5.0 (12.187 g) equivalents of NaCl added. The pH was not adjusted for this reaction. This reaction was stopped after 2 hours. Overall, the copper granules deposited from solution #3 (5 equiv.) were the largest. The yields were similar, however, solution #1 (3 equiv.) had the highest yield at 65% (#2: 53%; #3: 58%).

Figure 2:
FIG. 2 shows exemplary photographs of copper deposits on an iron bar from solutions comprising 0.8388M $CuSO_4$ and various amounts of NaCl (3 or 5 equivalents) according to examples of the present disclosure (center and right photographs in upper row, respectively) in comparison to copper deposits on an iron bar from a solution comprising 0.8388M $CuSO_4$ and no NaCl (left image in upper row) after a time of 2 hours as well as the iron bars following removal of the copper deposits (lower image, from left to right: 0, 3, and 5 equivalents NaCl).
Figure 2:
Figure 2:
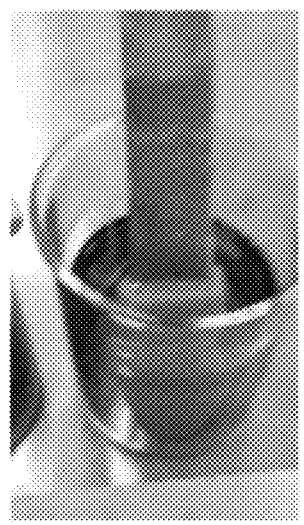
Figure 2:
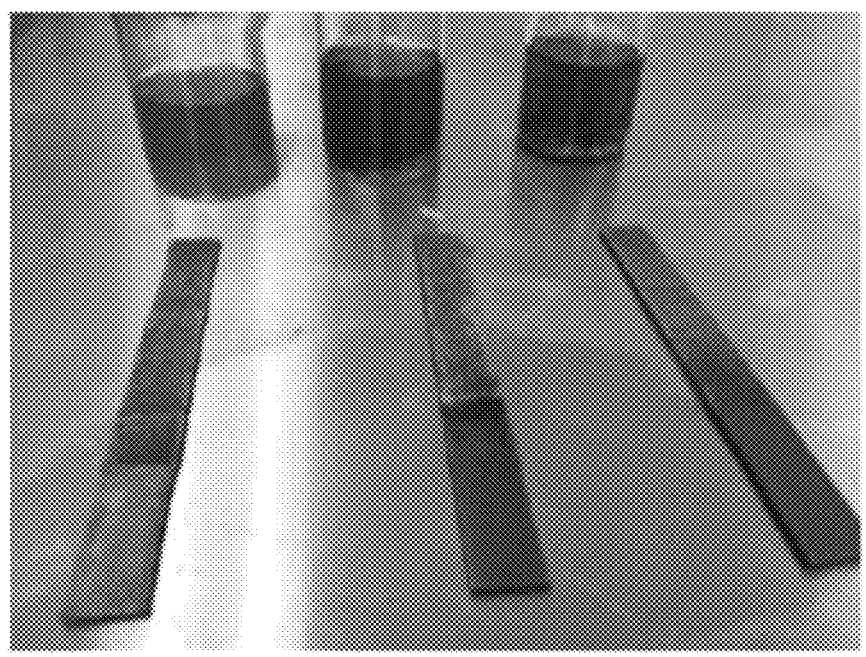

(c) The reaction described in (b) was repeated using 50 mL of 0.8388 M $CuSO_4$ solution in each of 3 beakers. No NaCl was added to the first solution (0 equiv., #1). To the other two solutions, 7.326 g (3.0 equiv., #2) and 12.208 g (5.0 equiv., #3) of NaCl was dissolved. Solution pHs were adjusted to 2 with $H_2SO_4$. The reaction was stopped at the 2 hour mark (FIG. 2, upper images). As with the initial experiment, the solution with no NaCl led to copper plating on the iron which was difficult to remove (FIG. 2, lower image). No yields were obtained for this reaction as a result. The granule size from solution #3 (5 equiv.) was larger than for that of solution #2 (FIG. 2, upper image). The yields for both were similar (88% and 85% respectively).

(d) This reaction (described in greater detail in Example 2(a)) compared solutions with 3.5 and 4.1 equivalents of NaCl on a larger scale (250 mL of 0.8308 M and 0.8303 M solutions of $CuSO_4$, respectively). The solution with 4.1 equivalents appeared to have larger granules than that of the solution with 3.5 equivalents.

In general, copper granule size on the surface appeared to increase with increasing NaCl concentration. The overall yields for copper deposition did not seem to be greatly affected by NaCl concentration. The efficacy with which copper could be removed from the iron is significant in particular when compared with solutions in which there was no NaCl added. A concentration of NaCl corresponding to at least 3 equivalents resulted in the production of good quality granules as well.

Example 2: Determination of Copper Granule Size (a) Two reactions were run concurrently. The first solution contained 0.8308 M $CuSO_4$ and 3.5 equivalents of NaCl. The second solution contained 0.8303 M $CuSO_4$ and 4.1 equivalents (maxed out balance) of NaCl. Each solution was poured into a container lined with horizontal Fe bars. The reactions were left for 2 hours to obtain optimal granule size. Following the workup of the reactions, the copper was run through a series of three sieves (860 μm, 250 μm, and 88 μm) to determine the size distribution of the granules produced. The granule size distribution for solution #1 was as follows: 59% larger than 860 μm; 24% between 250 and 860 μm; 16% between 88 and 250 μm; less than 1% smaller than 88 μm. The granule distribution for solution #2 was: 47% larger than 860 μm; 29% between 250 and 860 μm; 21% between 88 and 250 μm; around 3% smaller than 88 μm.

(b) The reaction described in (a) was repeated with a 0.8306 M $CuSO_4$ solution and 4.1 equivalents of NaCl. The size distribution of the granules was as follows: 54% larger than 860 μm; 25% between 250 and 860 μm; 21% between 88 and 250 μm; less than 1% smaller than 88 μm.

(c) The reaction described in (a) was completed using a 0.76 M $CuSO_4$ leach solution obtained from an exotic copper ore sample and 5 equivalents (55 g) of NaCl. The sample was described as being copper clay, copper albite and copper silica. However, the inventors determined it was an exotic copper ore with primarily chrysocolla with a minor portion of malachite. The distribution of granules sizes was determined to be: 18% larger than 860 μm, 49% between 250 and 860 μm; 33% between 88 and 250 μm; less than 1% smaller than 88 μm.

(d) The experiments described in greater detail in Example 3(a), 3(b) and 3(c) were designed to test the effect of reaction time on granule quality but granule size distribution was measured as well. For comparison, only the data from the solutions that ran for 120 minutes are used. The experiments were run with 50 mL 0.8541 M, 0.8310 M, and 0.8342 M $CuSO_4$ with 4.8, 4.9, and 4.9 equivalents of NaCl added respectively. The copper granule size distributions were as follows; 1.5% on average (0.6%, 2%, 2%) larger than 860 μm; 54% on average (54%, 58%, 49%) between 250 and 860 μm; 36% on average (35%, 34%, 39%) between 88 and 250 μm; 9% on average (11%, 6%, 11%) smaller than 88 μm.

Figure 3:
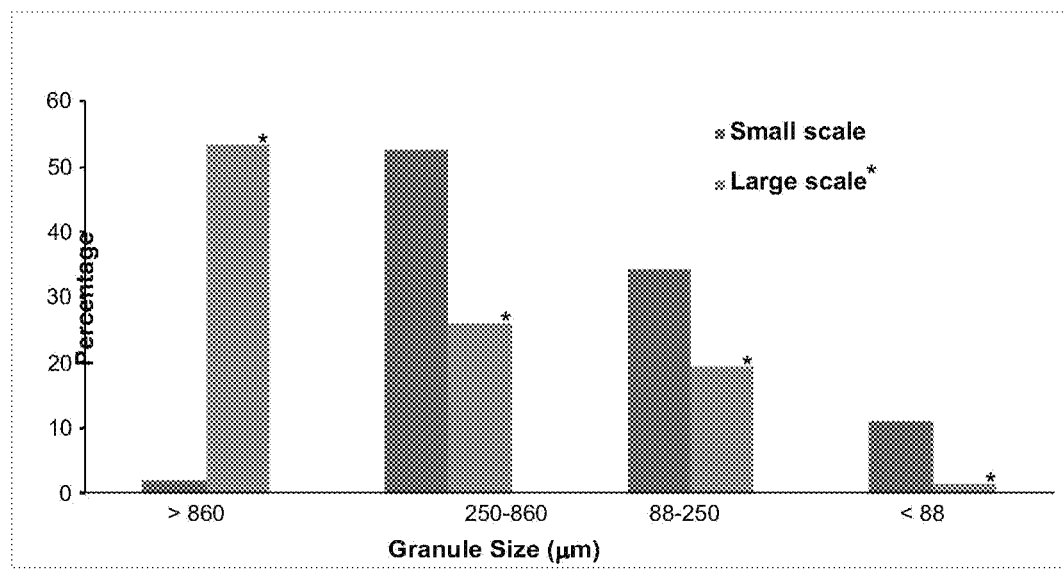
FIG. 3 is a plot showing percentage of copper granules having sizes of, from left to right: greater than 860 μm, from 250-860 μm, from 88-250 μm, and less than 88 μm obtained from small scale vs. large scale processes for preparing copper granules according to examples of the present disclosure.
Figure 4:
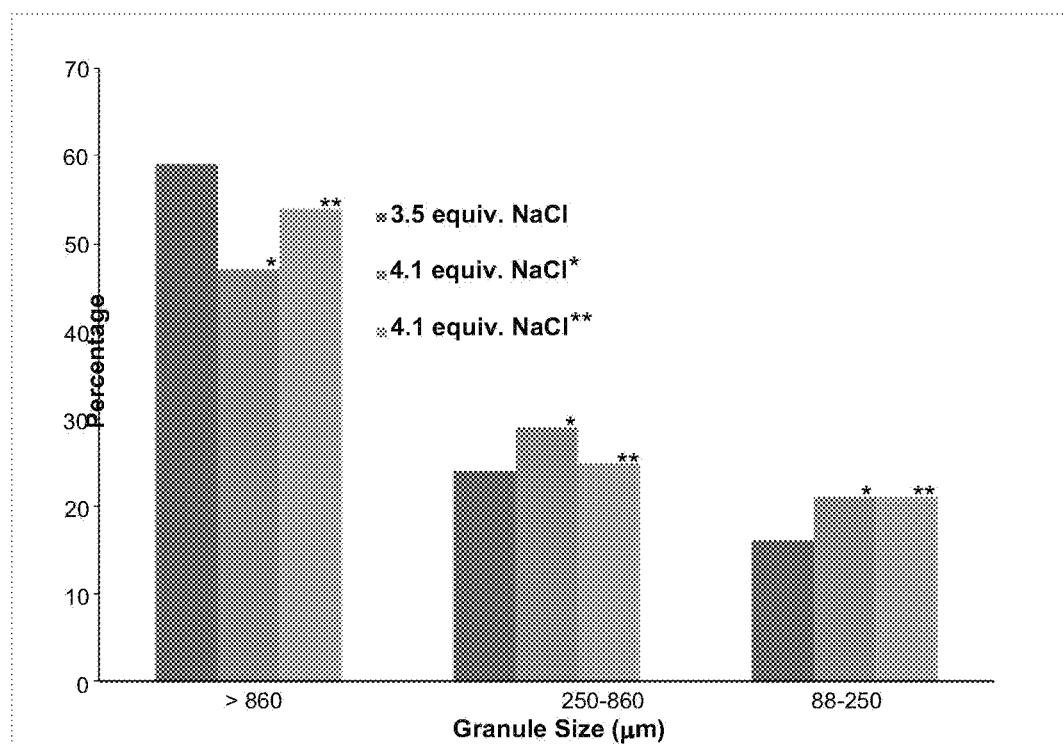
FIG. 4 is a plot showing percentage of copper granules having sizes of, from left to right: greater than 860 μm, from 250-860 μm, and from 88-250 μm obtained from processes for preparing copper granules using 3.5 versus a duplicate trial with 4.1 equivalents of NaCl according to examples of the present disclosure.

Overall, the larger scale experiments generally produced a greater proportion of granules larger than 860 μm, with more than 80% of the granules being larger than 250 μm (FIG. 3). The exception to this was the exotic copper ore leach solution where the majority of granules were between 250-860 μm (although almost 70% were still larger than 250 μm). While not wishing to be limited by theory, this may be due to concentration differences (see below). The small scale reactions produced the greatest amount of granules in the range of 250-860 μm, while roughly 90% fell between 88-860 μm. This differs from the large scale reactions where there was a much higher percentage of large granules (larger than 860 μm) and fewer in the lower range (88-250 μm). While the maximum granule size appeared to increase with increasing NaCl concentration, the overall size distribution as determined above does not seem to be appreciably affected by changes in NaCl concentrations (FIG. 4). However, these reactions were not run to completion. If the solutions were allowed to go until barren, while not wishing to be limited by theory, the ratio of granules would likely change as there is an increase in small granules after 120 minutes. While not wishing to be limited by theory, this may be due to $CuSO_4$ concentration as the quality of copper granules have been shown to be dependent on this, with smaller granules seen at lower concentrations.

Example 3: Effect of Reaction Time on Granule Size and Yield (a) A solution of 0.8541 M $CuSO_4$ and 5 equivalents of NaCl was divided between four beakers (50 mL in each). The reactions were worked up at 30, 60, 90 and 120 minutes respectively. Yields for the reactions were 44%, 72%, 75%, and 92% based on the initial $CuSO_4$ in solution. The efficiency of each reaction was 78%, 90%, 96%, and 97% based on the amount of iron consumed. The solids for each solution were then passed through the sieves described above. The results of the granule size distribution were as follows in Table 1:

TABLE 1

| Time (min) | >860 μm (%) | 250-860 μm (%) | 88-250 μm (%) | <88 μm (%) |
|---|---|---|---|---|
| 30 | 0 | 52 | 42 | 6 |
| 60 | 0.5 | 51.9 | 36.7 | 10.9 |
| 90 | 0.5 | 48.6 | 41.2 | 9.7 |
| 120 | 0.6 | 54.0 | 34.7 | 10.6 |

Under these conditions, the reaction time that produced the highest percentage of granule in the larger size ranges was 120 minutes.

(b) The reaction described in Example 3(a) was repeated using a 0.8310 M $CuSO_4$ solution with 5 equivalents of NaCl. This time the reaction was worked up after 30, 60, 90, 120 and 150 minutes. The yields based of $CuSO_4$ used were 34%, 59%, 78%, 93%, and 87% respectively. The efficiency of the reactions based on iron consumed was 77%, 87%, 91%, 94%, and 90% respectively. The results of the granule size distribution were as follows in Table 2:

TABLE 2

| Time (min) | >860 μm (%) | 250-860 μm (%) | 88-250 μm (%) | <88 μm (%) |
|---|---|---|---|---|
| 30 | 0 | 43 | 48 | 9 |
| 60 | 0.5 | 53.6 | 36.7 | 9.3 |
| 90 | 0.8 | 48.5 | 38.1 | 12.7 |
| 120 | 2 | 58 | 34 | 6 |
| 150 | 3 | 56 | 33 | 8 |

The results generally agree with those of Example 3(a).

(c) The experiment described in Example 3(a) was repeated using a 0.8342 M $CuSO_4$ solution and 5 equivalents of NaCl. Similar to Example 3(b), the reaction was worked up after 30, 60, 90, 120 and 150 minutes. The yields for the reaction were 31%, 59%, 81%, 85%, and 92% respectively. The percent efficiency of the reaction was 70%, 87%, 93%, 93%, and 94% respectively. The results of the granules size distribution was as follows in Table 3:

TABLE 3

| Time (min) | >860 μm (%) | 250-860 μm (%) | 88-250 μm (%) | <88 μm (%) |
|---|---|---|---|---|
| 30 | 0 | 23 | 63 | 13 |
| 60 | 0.2 | 43.4 | 41.5 | 14.9 |
| 90 | 1 | 53 | 38 | 8 |
| 120 | 2 | 49 | 39 | 11 |
| 150 | 1 | 49 | 36 | 14 |

The results of this experiment generally agree with the experiments of Examples 3(a) and 3(b) with the exception that the yield was improved at 150 minutes over 120 minutes which was not the case in Example 3(b).

(d) A reaction similar to that of Examples 3(a)-(c) was performed with the exotic copper ore leach solution (0.6107 M) with 5 equivalents of NaCl added. The reaction was worked up after 90, 120 and 150 minutes. The yields were 57%, 65% and 76% respectively. The percent efficiency of the reaction was 89%, 89% and 94% respectively. The granule size distribution was as follows in Table 4:

TABLE 4

| Time (min) | >860 μm (%) | 250-860 μm (%) | 88-250 μm (%) | <88 μm (%) |
|---|---|---|---|---|
| 30 | 0.3 | 44.5 | 45.2 | 10.0 |
| 60 | 0.1 | 46.9 | 41.4 | 11.6 |
| 90 | 1.8 | 55.2 | 31.9 | 11.2 |

While the yields were significantly lower than those of the stock solutions, the granule size distribution does not seem to be greatly affected after 90 minutes and was comparable with the stock solution results. Yields were comparable when the reaction was extended.

(e) The reaction from Example 3(d) was repeated using a 0.6055 M stock solution and 5 equivalents of NaCl. The yields were found to be 70%, 78% and 83% for 90, 120 and 150 minutes respectively. The efficiencies were 92%, 95% and 96% respectively. The size distribution for the granules was as follows in Table 5:

TABLE 5

| Time (min) | >860 μm (%) | 250-860 μm (%) | 88-250 μm (%) | <88 μm (%) |
|---|---|---|---|---|
| 30 | 1.3 | 62.8 | 28.8 | 7.1 |
| 60 | 2.4 | 56.4 | 29.4 | 11.8 |
| 90 | 3.1 | 57.0 | 27.6 | 12.3 |

The results agreed well with those experiments of Examples 3(a)-3(c) which used stock solutions.

Figure 5:
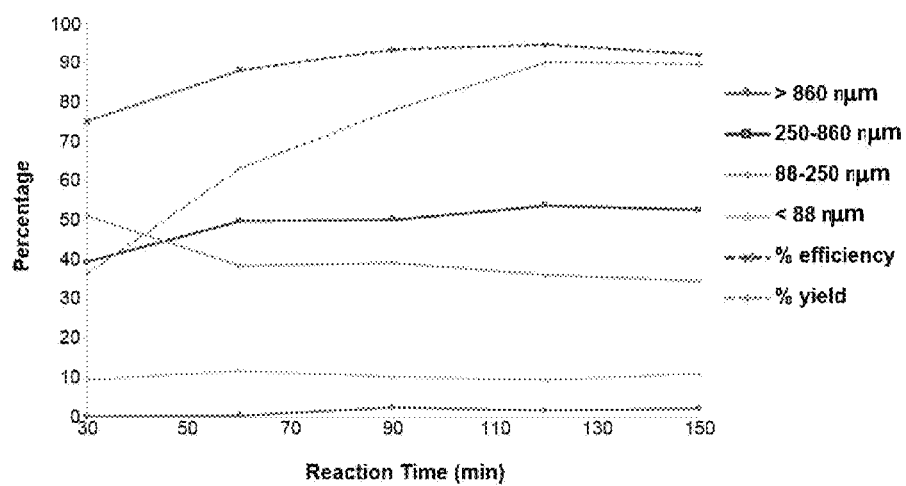
FIG. 5 is a plot showing granule size distribution and reaction yield as a function of reaction time for processes for preparing copper granules from stock solutions of $CuSO_4$ using 5 equivalents of NaCl according to examples of the present disclosure. Values are an average of three experiments.
Figure 6:
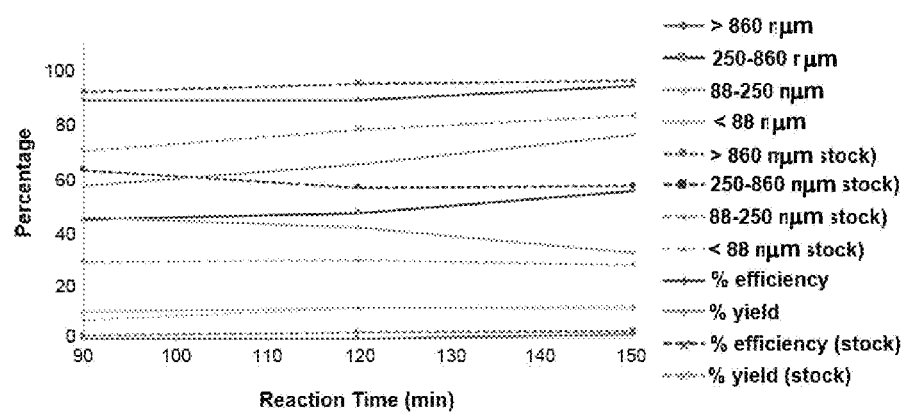
FIG. 6 is a plot showing granule size distribution and reaction yield as a function of reaction time for processes for preparing copper granules from an exotic copper ore leach solution in comparison to stock solutions of $CuSO_4$ using 5 equivalents of NaCl according to examples of the present disclosure.

FIG. 5 presents a more detailed analysis than FIG. 4 of a reaction in which the ratio of chloride to copper is 5:1. This plot shows the granule size distribution and reaction yield as a function of reaction time. Overall, the reaction time that led to advantageous values in both yield and granule quality in the stock solution was 120 minutes. The granule size distribution appeared to be fairly consistent after 90 minutes. For the leach solutions, a slightly longer time of 150 minutes or even longer may be useful to achieve the same yields as those seen in the stock solutions. The distribution of particle sizes in this experiment is similar to those reactions with a ratio of chloride to copper of 4:1.

Figure 7:
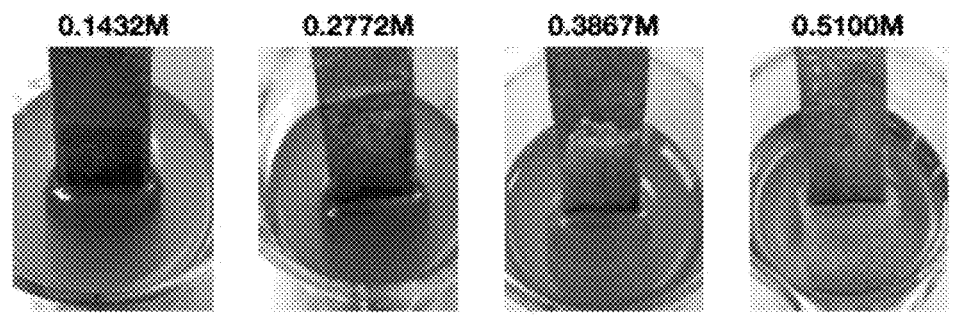
FIG. 7 shows exemplary photographs of copper deposits on an iron bar from solutions comprising, from left to right: 0.1432 M, 0.2772 M, 0.3867 M, and 0.5100 M $CuSO_4$ and 4.5 equivalents of NaCl according to examples of the present disclosure after a time of 120 minutes.

Example 4: Effect of CuSO$_4$ Concentration (a) Four 50 mL solutions were prepared with 4.5 equivalents of NaCl and CuSO$_4$ concentrations of 0.1432 M, 0.2772 M, 0.3867 M and 0.5100 M. The reactions were left to proceed for 120 minutes. Reaction yields increased with increasing CuSO$_4$ concentration up to 0.3867 M after which yields remained substantially constant (#1: 59%; #2: 67%; #3: 75%; #4: 73%). While not wishing to be limited by theory, the granule size was qualitatively the highest for the 0.51 M solution and decreased with decreasing CuSO$_4$ concentration (FIG. 7).

(b) The reaction of Example 4(a) was repeated with solutions of 0.1757 M, 0.2748 M, 0.3762 M, and 0.5120 M CuSO$_4$ with 5 equivalents of NaCl. The yields in this case increased with increasing [CuSO$_4$] (#1: 54%; #2: 73%; #3: 75%; #4: 78%). Similar results to Example 4(a) regarding granule size were obtained. Concentrations of less than 0.51 M did not appear to yield quality granule.

(c) The experiment was repeated with 3.5 equivalents of NaCl and CuSO$_4$ concentrations of 0.1432 M, 0.2544 M, 0.3942 M, and 0.5193 M. None of the solutions produced quality granule although solution #4 (0.5193 M CuSO$_4$) yielded the best solids. Yields increased with increasing [CuSO$_4$] up to 0.3942 M where they substantially levelled off (#1: 62%; #2: 76%; #3: 86%; #4: 85%).

Overall, yields generally increased with increasing CuSO$_4$ concentration up to about 0.38M. Below 0.51 M CuSO$_4$, the copper deposited appeared to be non-granular. The concentrations of NaCl that were used in this Example did not appear to affect these results.

Example 5: Comparison of Granule Appearance and Different Halide:Copper Ratios

Figure 8A:
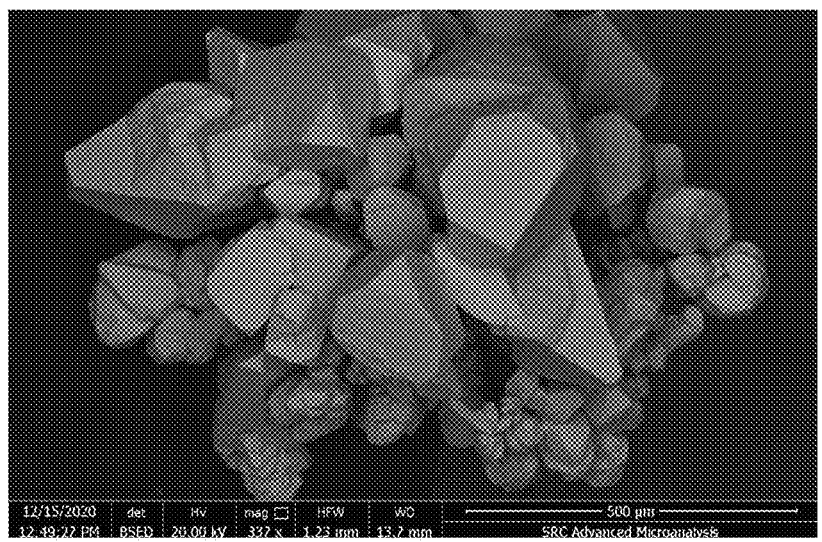
FIG. 8A shows copper metal generated from an exemplary 4:1 initial chloride to copper ratio.
Figure 8B:
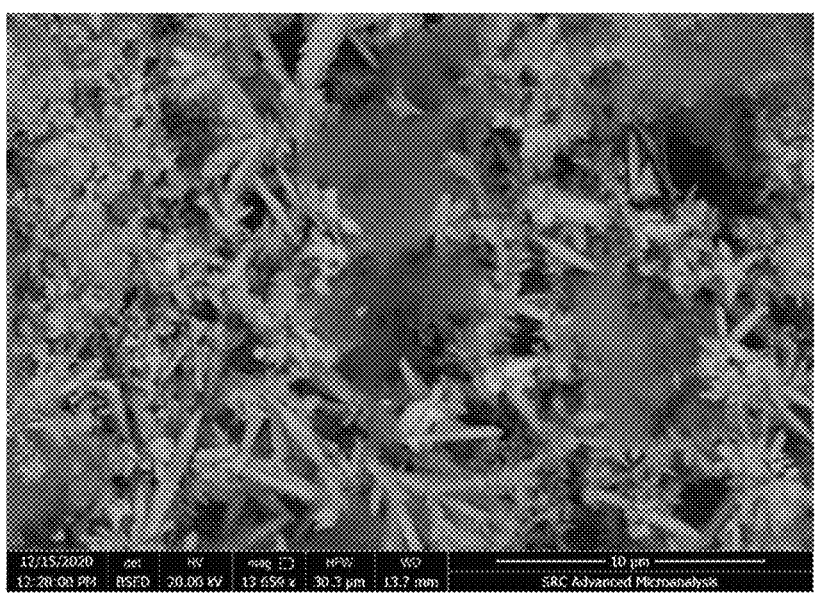
FIG. 8B shows copper metal generated from a comparative 1:1 initial chloride to copper ratio.

Using methods similar to those described in Example 1(a), copper was precipitated as coarse, blocky crystalline granules at high ratios of initial molar ratios of chloride to copper (4:1), as seen in FIG. 8A. At low initial chloride to copper molar ratios (1:1), the precipitated copper tend more towards dendritic crystals, as shown in FIG. 8B.

Discussion

In the present process, pre-reduction of copper(II) is unnecessary; the reduction proceeds smoothly and the Cu(II) in solution is reduced smoothly to granular metallic copper. While not wishing to be limited by theory, the redox regime at play in is based upon the following redox reaction:

$$CuCl_x^{n-} + 2e^{-1} <-> Cu^0 + xCl^{-1}, \text{ where } x=3 \text{ or } 4 \text{ and } n=1 \text{ or } 2 \quad (1)$$

In contrast, the proposed redox equations in International Publication No. WO 2009/007792 A1 are:

$$Cu^{+1} + e^{-1} <-> CuE^0 = 0.52 \text{ V} \quad (2)$$

$$Cu^{2+} + 2e^{-1} <-> CuE^0 = 0.34 \text{ V} \quad (3)$$

In equations 2 and 3, the concentrations of Cu$^{1+}$ and Cu$^{2+}$ are determined from the equilibria, where only a small fraction of the copper is present as the uncomplexed ion in solutions containing appreciable amounts of chloride:

$$Cu^{+1} + 4Cl^- <-> CuCl_4^{-3} \quad (4)$$

$$Cu^{+2} + 4Cl^- <-> CuCl_4^{-2} \quad (5)$$

In the process of International Publication No. WO 2009/007792 A1, the preliminary reduction would actually be based on the reduction of the tetrachlorocuprate(II) to the tetrachlorocuprate(I), the value of the potential for this reaction is unreported (see H. Zhou, J. Chang, A. Boika, A. J. Bard, Anal. Chem., 2013, 85, 7696-7703):

$$CuCl_4^{-2} + e^{-1} \longleftrightarrow CuCl_4^{-3} \quad (6)$$

In the absence of literature values for the various equilibria, it is difficult to predict the significance of the impact of complexation on the progress of the reactions. However, in the examples of the present disclosure which comprise the use of sufficient amounts of NaCl, no preliminary reduction is required. Copper was deposited smoothly and no evidence of CuCl was apparent. The high levels of chloride had a significant impact on the course of this reaction. Other suitable halides would likely have a similarly significant effects on the outcome of this reduction both in terms of adhesion of the copper and purity of the product. For example, copper bromide is expected to react similarly to copper chloride.

While the above description provides examples of one or more apparatuses or methods, it will be appreciated that other apparatuses or methods may be within the scope of the accompanying claims.

What is claimed is:

1. A process, comprising:
preparing an aqueous solution comprising a copper(II) salt and a halide;
contacting a reducing metal with the aqueous solution;
stirring and/or circulating the aqueous solution;
producing granular copper on a surface of the reducing metal and is weakly adhered thereto; and
removing the granular copper from the surface of the reducing metal by force of gravity without scraping,
wherein the reducing metal is iron,
wherein the molar ratio of the halide to the copper(II) in the aqueous solution is from about 3:1 to about 5:1, and
wherein the aqueous solution has a pH between about 2 and about 3.

2. A process for producing granular copper metal, the process comprising contacting a reducing metal with an aqueous solution,
wherein the aqueous solution comprises:
(i) a copper(II) salt; and
(ii) a halide,
wherein the reducing metal is iron,
wherein the halide is chloride,
wherein the molar ratio of the halide to the copper(II) in the aqueous solution is from about 3:1 to about 5:1,
wherein the aqueous solution has a pH between about 2 and about 3, and
wherein the granular copper is produced on a surface of the reducing metal and is weakly adhered thereto.

3. The process of claim 2, wherein the halide is introduced into the aqueous solution in the form of a sodium salt or a calcium salt.

4. The process of claim 2, wherein the concentration of the copper(II) salt in the aqueous solution is from about 0.5 M to about 0.9 M.

5. The process of claim 2, wherein the aqueous solution is prepared by combining $CuSO_4$ or $CuCl_2$ and the halide.

6. The process of claim 2, wherein the copper(II) salt is $CuSO_4$.

7. The process of claim 2, comprising adjusting a pH of the aqueous solution by adding an acid, wherein the acid is selected from sulfuric acid, hydrochloric acid, nitric acid, and a mixture thereof.

8. The process of claim 2, comprising adjusting a pH of the aqueous solution by adding a base, wherein the base is sodium hydroxide.

9. The process of claim 2, wherein the aqueous solution is prepared by a process comprising adding a salt of the halide to an aqueous solution comprising the copper(II) salt.

10. The process of claim 2, wherein the aqueous solution comprising the copper(II) salt is obtained from a process comprising leaching a copper ore.

11. The process of claim 10, wherein the copper ore is leached with sulfuric acid.

12. The process of claim 2, comprising removing the granular copper from the surface of the reducing metal by shaking, washing, and/or brushing.

13. The process of claim 2, comprising removing the granular copper from the surface of the reducing metal without scraping.

14. The process of claim 2, comprising stirring and/or circulating the aqueous solution.

15. The process of claim 2, wherein greater than about 95% of the granular copper produced has a particle size greater than about 88 µm.

16. The process of claim 2, wherein the contacting is at a temperature of between about 4° C. and about 40° C.

17. The process of claim 2, wherein the contacting is at a temperature of between about 15° C. and about 25° C.

18. A process, comprising:
leaching a copper ore with sulfuric acid to obtain a copper(II) salt;
adding sodium chloride to the copper(II) salt to prepare an aqueous solution;
contacting a reducing metal with the aqueous solution;
stirring and/or circulating the aqueous solution; and
producing granular copper on a surface of the reducing metal and is weakly adhered thereto,
wherein the reducing metal is iron,
wherein the molar ratio of the sodium chloride to the copper(II) in the aqueous solution is from about 3:1 to about 5:1, and
wherein the aqueous solution has a pH between about 2 and about 3.

* * * * *